United States Patent [19]

Rivers

[11] 4,049,406
[45] Sept. 20, 1977

[54] FLUID FILTER HOUSING AND ASSEMBLY

[75] Inventor: Richard D. Rivers, Louisville, Ky.

[73] Assignee: American Air Filter Company, Inc., Louisville, Ky.

[21] Appl. No.: 679,516

[22] Filed: Apr. 23, 1976

[51] Int. Cl.² .................. B01D 53/04; B01D 27/00; B01D 35/00
[52] U.S. Cl. ........................................ 55/484; 55/387
[58] Field of Search ............... 210/263, 282, 287, 435, 210/450, 451, 455, 477; 55/484, 479, 355, 387

[56] References Cited

U.S. PATENT DOCUMENTS

| | | | |
|---|---|---|---|
| 2,826,480 | 3/1958 | Webster | 23/232 R X |
| 3,288,566 | 11/1966 | Turk | 23/259 |
| 3,486,311 | 12/1969 | Allan, Jr. | 55/355 |
| 3,581,476 | 6/1971 | Rivers | 55/387 |
| 3,873,287 | 3/1975 | Barnebey | 55/387 X |

FOREIGN PATENT DOCUMENTS 876,884  2/1953  Germany .................... 55/484

Primary Examiner—Joseph Scovronek
Assistant Examiner—Roger F. Phillips

[57] ABSTRACT

A fluid filter housing and assembly therefor including a housing with a flow-through inlet and a flow-through outlet, the housing having channels of U-shaped cross section with open tops extending around the perimeter of the flow-through inlet to receive filter assemblies therein, the channels having fluid filtering material therein, the filter assemblies having continuous downwardly extending members along the outer periphery thereof, the downwardly extending members being received by the channels whereby gases passing around the filter assemblies pass through the filtering material so that leakage of fluids around the sealing between the filter assemblies and the housing are treated by the filter material in the seal prior to passing to the housing outlet.

8 Claims, 3 Drawing Figures

FLUID FILTER HOUSING AND ASSEMBLY

BACKGROUND OF THE INVENTION

This invention relates to fluid filter assemblies including replaceable filter elements therein and more particularly relates to means for providing fluid treating means between the filter assembly and the filter assembly receiving portion of a flow-through housing.

In applications where an undesirable impurity is removed from a fluid stream by passing the fluid stream through a fluid treating material, such as a porous bed adsorption media, many different devices have been provided to satisfy the requirements of such applications. In most of the applications where an adsorbent is used means must be provided to replace the treating material therein. In most previous devices the adsorbing or filtering elements are releasibly retained in a cooperative frame assembly and expensive lock arrangements have been provided to maintain the filtering elements in filtering position, yet allow the elements to be accessible for removal of the adsorbent. Furthermore, since such elements are provided to separate impurities from a fluid passing therethrough, it is necessary that all of the fluid pass through the element and previous arrangements have included complex and unreliable seal assemblies to prevent undesirable fluid leakage around the filtering elements.

SUMMARY OF THE INVENTION

The present invention recognizes that in various applications, for example, in the treatment of an effluent fluid stream from nuclear reactor installations, an adsorbent material is provided to receive the stream of effluent material. This adsorbent or filtering material must be capable of adsorbing impurities carried by such effluent while withstanding unusual operating characteristics such as high pressure, temperature, or an increased fluid flow rate. It is further recognized that in such applications the adsorbent material and its containers become contaminated by certain materials carried by the fluid so the entire filter or adsorbing element must be discarded after a limited period of use and therefore it is desirable to provide an inexpensive element and a seal means which are sturdy enough to withstand highly adverse operating conditions, yet which allow easy replacement of the element. It is even further recognized that the present invention provides a disposable filter element therein and retaining frame arrangement which is essentially self-sealing to eliminate complex and fragile seal arrangements and is straghtforward to fabricate.

Various other features of the present invention will become obvious to those skilled in the art upon reading the disclosure set forth hereinafter.

More particularly, the present invention provides a fluid filter housing and assembly therefore comprising: a housing having a flow-through inlet and a flow-through outlet therein; the housing having a channel of U-shaped cross section with an open top extending along the inner periphery of the flow-through inlet and including fluid filtering material therein; and, a replaceable filter assembly disposed within the housing in flow-through communication with the inlet and the outlet, the filter assembly having a continuous downwardly extending member along the outer periphery thereof, the member being received by the channel whereby gases passing around the filter assembly pass through the filtering material in the channels.

It is to be understood that the description of the examples of the present invention given hereinafter are not by way of limitation. Various modifications within the scope of the present invention will occur to those skilled in the art upon reading the disclosure set forth hereinafter.

Referring to the drawing.

Figure 1:
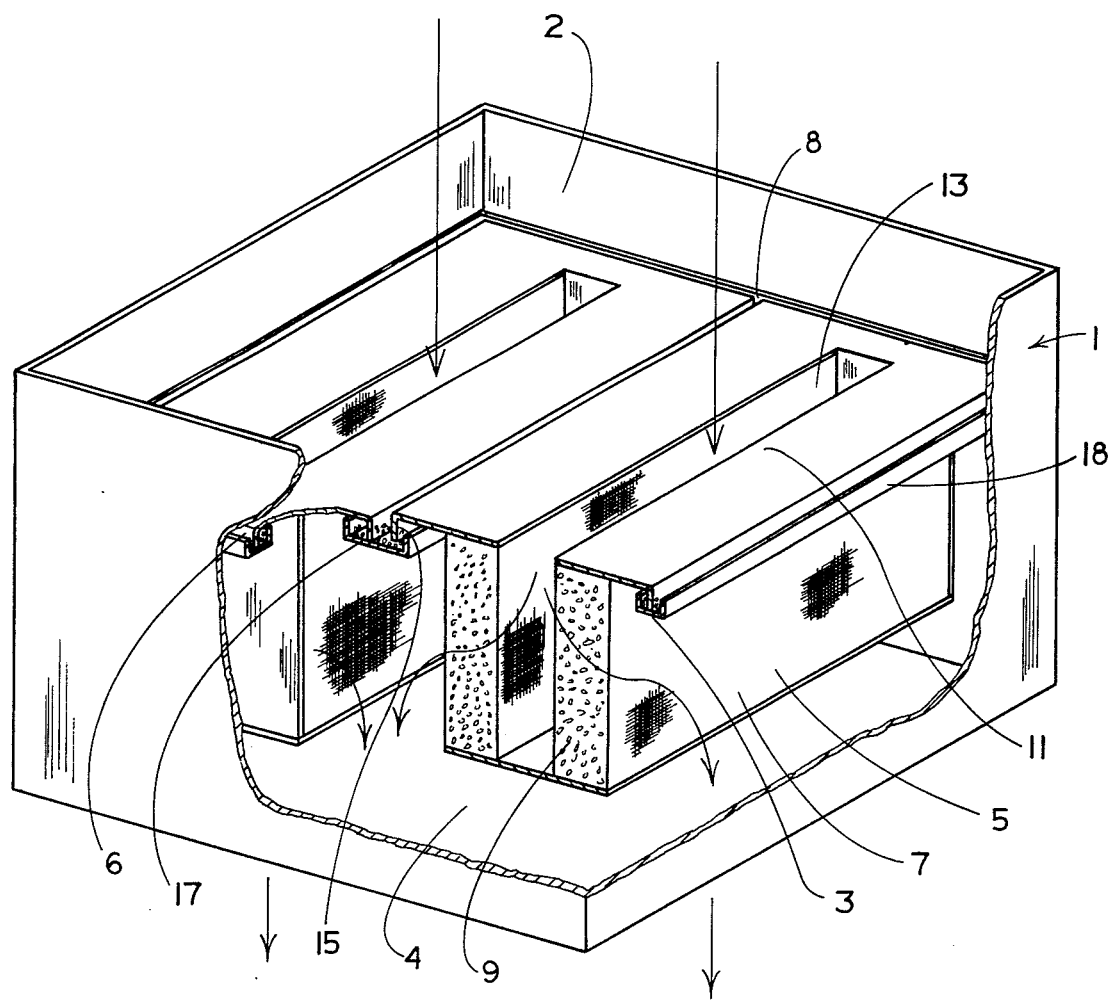
FIG. 1 is a perspective view, partially cutaway, of one preferred fluid filter assembly of the present invention showing an arrangement for use in a vertical flow.

A housing 1, as shown in FIG. 1, includes a vertically extending flow-through inlet 2 and a vertically extending flow-through outlet 4, the inlet 2 and outlet 4 being separated by septum 18 which is penetrated by one or more openings; the openings being defined by a channel-shaped recess 3 having its open end extending upwardly to receive the downward-projecting rim 15 of a filter assembly 5.

Each replaceable filter assembly 5 includes one or more filter elements 7 which are foraminous containers usually made from a screen material and formed into a basket and attached to plate member 11 which includes apertures 13 therein in flow-through communication with the elements 7. The plate member 11 is provided with continuous downwardly extending portions 15 along the outer periphery thereof which are received by the channel-shaped recess 3.

The filter elements 7 contain filtering or adsorbing material 9 therein, the filtering or adsorbent material being, for example, carbon granules utilized in the adsorption of radioactive materials, such as radioactive iodine in a fluid flow stream. The channel-shaped recess 3 also includes filtering or adsorbing material 9 therein whereby gases passing around the filter elements 5 pass through the adsorbing material 9 and the undesirable matter contained in the fluid stream is removed thereby.

As shown in FIG. 1, there are two replaceable filter assemblies 5 disposed within the housing 1. In order to provide for a flow-through seal between the elements 5, channel-shaped cross member 17 is disposed between the end portions 6 and 8 of the recess 3. The channel-shaped cross member 17 is also filled with porous adsorbent material 9 whereby gases passing around and between the replaceable filter assemblies 5 pass through the porous adsorbent as discussed previously.

Figure 2:
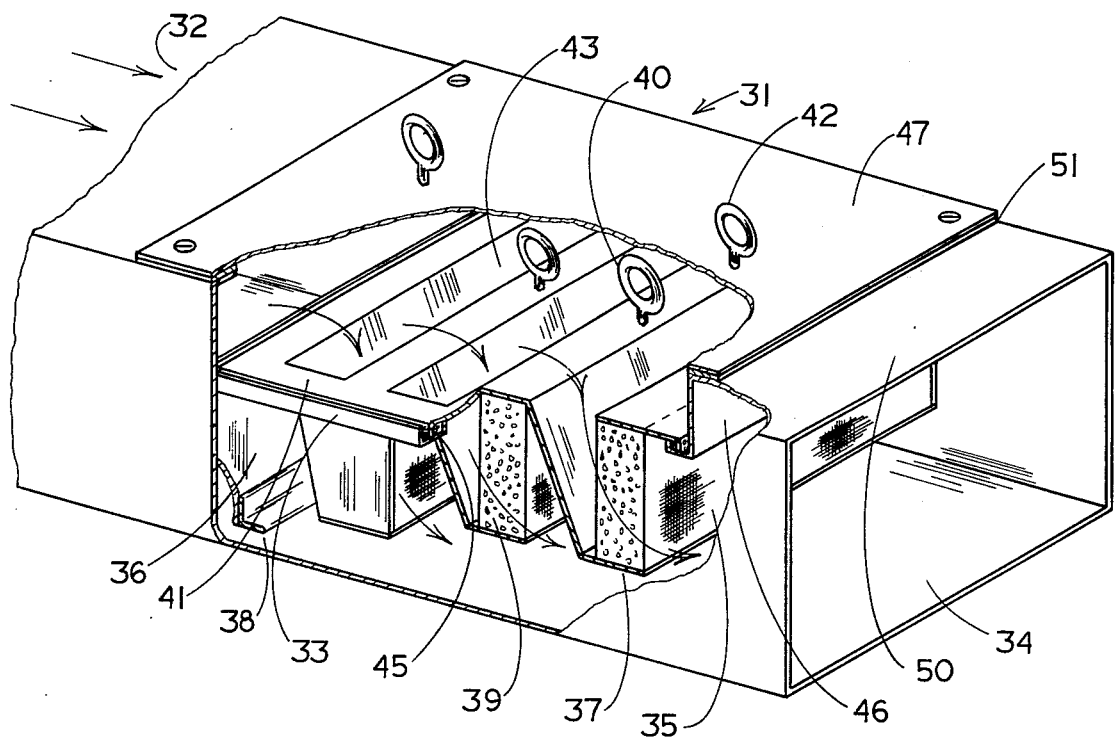
FIG. 2 is a perspective view, partially cutaway, of another preferred fluid filter assembly of the present invention showing the fluid filter assembly for use in a down flow unit in horizontal fluid flow; and, FIG. 3 is a perspective view, partially cutaway, of even another preferred embodiment of the present invention showing a tray unit in horizontal flow.

Housing 31, as shown in FIG. 2, includes a horizontally extending flow-through inlet 32 and a horizontally extending flow-through outlet 34 with a channel-shaped recess 33 extending along the sides of the upper wall portion of the housing at a preselected distance from the top with transversely extending end portions connecting the side portions thereby defining a rectangular-shaped open area. Recess 33 is adaptable to receive a replaceable filter assembly 35 therein.

The replaceable filter assembly 35 includes a plurality of filter elements 37 which are foraminous containers usually made from a screen material and formed into a basket and attached to plate member 41 which includes a plurality of apertures 43 therein in flow-through communication with the filter elements 37. The plate member 41 is provided with continuous downwardly extending rims 45 along the outer periphery thereof which are received by the channel-shaped recess 33.

The filter elements 37 contain filtering or adsorbing material 39 therein. The channel-shaped recess 33 also includes filtering or adsorbing material 39 therein. Disposed between the recess 33 and the bottom wall 38 of the housing 31 is a baffle 36, baffle 36 being attached and sealed to the recess 33 and the bottom wall 38. Baffle 36 forces all of the flowing fluid to pass across the top of the filter assembly 35, then downwardly through the filter elements 37. The filter assembly 35 is also provided with a pair of eyelets 40 for attaching to removal means (not shown) for easy replacement of the assembly 35.

In alignment with and disposed directly above the filter assembly 35 is an easy opening access door 47 which is provided with a gas-tight seal 51 where door 42 attaches to the top walls 50 of housing 31. Disposed between and attached to recess channel 33 and seal 51 is a baffle member 46 which prevents fluid from passing through the outlet 34 prior to passing through adsorbent material 39. Door 47 is also provided with eyelets 42 for attaching to removal means (not shown) for easy removal of the door when replacing the disposable or replaceable filter assembly 35.

Figure 3:
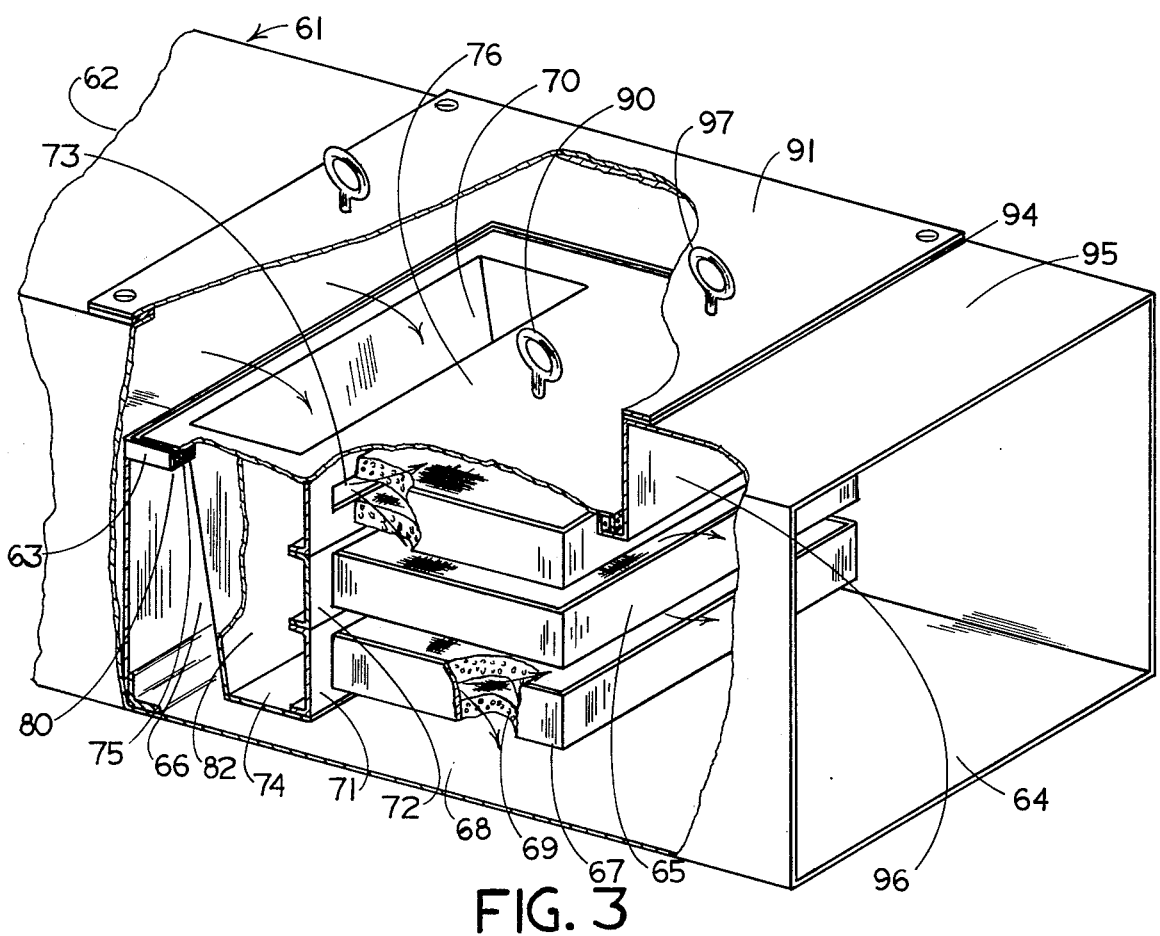

FIG. 3 shows another preferred embodiment of the present invention for use in horizontal flow. A flow-through housing 61 having a horizontally extending flow-through inlet 62 and a horizontally extending flow-through outlet 64 is shown with a channel-shaped recess 63 extending along the sides of the upper wall portion of the housing at a preselected distance from the top with transversely extending end portions connecting the side portions thereby defining a rectangular-shaped open area. Recess 63 is adaptable to receive a replaceable filter assembly 65 therein.

The replaceable filter assembly 65 includes a plurality of filter trays or filter elements 67 therein, elements 67 being foraminous containers usually made from a screen material and formed into a basket and attached, usually by welding, to a vertically extending plate member 71 which includes a plurality of apertures 73 therein. The plate member 71 is constructed generally of a plurality of channel members 72, each channel member 72 being adapted to receive one filter tray 67 therein. The channel members 72 are generally welded together and then the unit 71 is attached, generally by welding, to a bottom wall 74 of the assembly 65 at one end and an opposed wall 76 at the other. Wall 76 is provided with a downwardly extending rim 75 which is adaptable for seating in channel-shaped recess 80 which extends transversely across housing 61 at the preselected spacing from the top thereof.

The bottom wall 74 includes a portion which extends upstream of the plate member 71, the upstream end terminating in an angularly vertically extending section 82. The upper end of the section 82 attaches to the underside of wall 76 wherein the spacing between the wall 82, wall 74 and plate member 71 defines a plenum 70 for the inlet fluid.

The filter trays 67 contain filtering or adsorbing material 69 therein, the filtering or adsorbent material being the same as discussed previously. The channel-shaped recess 63 also includes filtering or adsorbing material 69 therein. Disposed between the recess 63 and the bottom wall 68 of the housing 61 is a baffle 66, baffle 66 being attached, usually by welding, to the recess 63 and the bottom wall 68. Baffle 66 forces all of the flowing fluid to pass into the plenum 70 and then horizontally through the openings 73 in plate member 71 into the filter trays 67. The filter assembly 65 is also provided with eyelets 90 for attaching to removal means (not shown) for easy replacement of the assembly 65.

In alignment with and disposed directly above the filter assembly 65 is an easy opening access door 91 which is provided with a gas tight seal 94 where it attaches to the top wall 95 of housing 61. Disposed between and attached to recess channel 63 and seal 94 is a baffle member 96 which prevents fluid from passing through the outlet 64 prior to passing through the adsorbent material 69. Door 91 is also provided with eyelets 97 for attaching to removal means (not shown) for easy removal of the door when replacing the disposable replaceable filter assembly 65.

It is realized that various changes may be made to the specific embodiments shown and described without departing from the scope and principles of the present invention.

What is claimed is:

1. A fluid filter housing and assembly comprising: a housing having a flow-through inlet and a flow-through outlet therein;
   said housing having a channel of U-shaped cross section with an open top extending along the inner periphery of said flow-through inlet, and including fluid filtering material therein; and,
   a replaceable filter assembly disposed within said housing in flow-through communication with said inlet and said outlet, said filter assembly having a continuous downwardly extending member along the outer periphery thereof, said member being received by said U-shaped channel whereby gases passing around said filter assembly pass through said filtering material in said U-shaped channel.

2. The fluid filter housing and assembly of claim 1 wherein said channel of U-shaped cross section defines a rectangular-shaped open area.

3. The fluid filter housing and assembly of claim 2, at least one channel having fluid filtering material therein extending between two opposed sides of said rectangular-shaped open area to define a plurality of rectangular-shaped open areas, each rectangular-shaped open area receiving a replaceable filter assembly therein.

4. The fluid filter housing and assembly of claim 1, said housing disposed for vertical flow, said flow-through inlet extending in a vertical direction and said flow-through outlet extending in a vertical direction in substantial alignment with said inlet.

5. The fluid filter housing and assembly of claim 1, said housing being disposed for horizontal flow, said inlet extending horizontally and said outlet extending horizontally, said housing including a first vertically extending baffle member disposed across said inlet from the bottom of said housing to a preselected distance spaced from a top of said housing and a second vertically extending baffle member disposed across said outlet from said top of said housing to a preselected distance spaced from said bottom of said housing, the upper extremity of said first baffle and the lower extremity of said second baffle being in spaced alignment, said channels containing fluid filtering material therein and extending along said upper extremity of said first baffle, the side walls of said housing, and said lower extremity of said second baffle thereby defining an open area to receive said filter element therein.

6. The fluid filter housing and assembly of claim 5, said replaceable filter assembly including filter elements extending vertically upward.

7. The fluid filter housing and assembly of claim 5, said replaceable filter assembly including filter elements extending in a horizontal position.

8. The fluid filter housing and assembly of claim 7, said filter assembly including a vertically extending front wall disposed between said first baffle and said filter elements, said front wall being in communication with said channel, said filter elements having inlets communicating with aligned openings in a vertically extending plate member, said front wall and said plate member defining a plenum for receiving a fluid therein.

* * * * *